3,773,900
SO₂ RECOVERY AND CONVERSION TO ELEMENTAL SULFUR

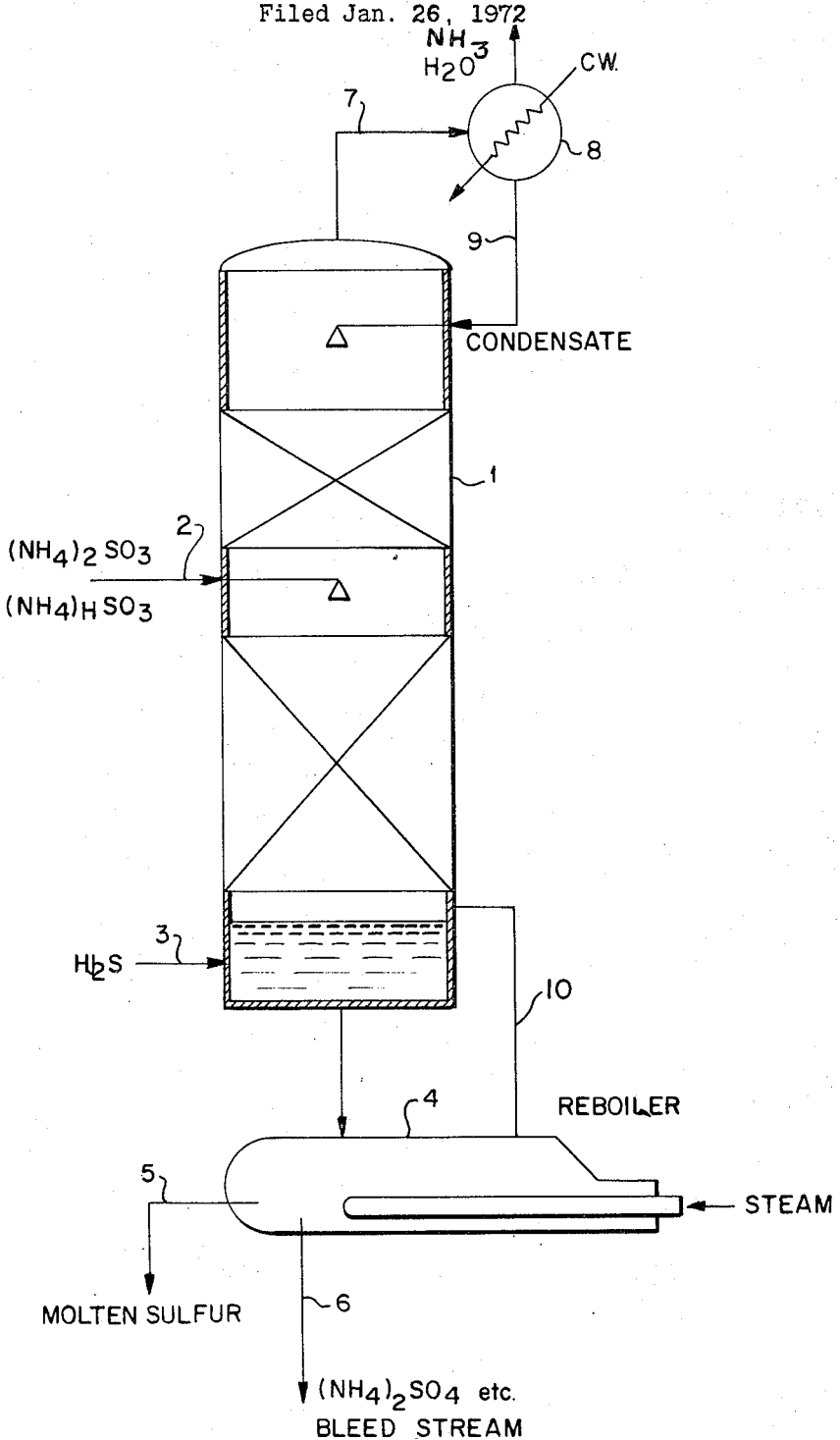

Edward S. Roberts, Ridgewood, and Sidney B. Tuwiner, Baldwin, N.Y., assignors to Treadwell Corporation, New York, N.Y.
Filed Jan. 26, 1972, Ser. No. 220,892
Int. Cl. B01b *3/26;* C01b *17/02;* C01c *1/02*
U.S. Cl. 423—356                                4 Claims

ABSTRACT OF THE DISCLOSURE

Sulfur dioxide is absorbed from gases containing it, for example stack gases from the combustion of sulfur-containing coal or oil, in an aqueous solution of ammonium sulfite and bisulfite, preferably with a molar concentration ratio of $SO_2$ to $NH_3$ between 0.6 and 0.8. The solution of ammonium sulfite and bisulfite are stripped in a column under positive pressure with a rising stream of water vapor and gas containing hydrogen sulfide or carbonyl sulfide, which act as sulfiding gases. The column is operated at a temperature which is above the melting point of elemental sulfur and the sulfiding gas is introduced at or near the bottom of the column, for example above a reboiler. The molten elemental sulfur flows down the column as a liquid. The overhead from the column contains ammonia and water vapor substantially free of $H_2S$ or $SO_2$. Similarly, the bottom of the column and the reboiler contain ammonium sulfate and other salts of ammonium but substantially no $SO_2$. The operation of this column obviates the use of an expensive organic solvent and the regeneration thereof, as has been employed in the art.

BACKGROUND OF THE INVENTION

Absorption of $SO_2$ in aqueous alkaline solution is well known by processes using an aqueous alkaline absorbent. These can be the ordinary alkalies, such as lime, magnesia, caustic alkalies and the like, or ammonia. Ammoniacal solutions are among the best absorbents, it being realized that the ammonia reacts with the $SO_2$ in aqueous solution and so the solution contains mixtures of ammonium sulfite and bisulfite and small amounts of ammonium sulfate, resulting from oxidation of $SO_2$ to $SO_3$, and also some thiosulfate, which also is obtained by oxidation. While it is possible in the case of very cheap alkalies, such as lime, to discard the calcium salts, this represents a loss which is more serious with more expensive alkalies, such as the ammoniacal solutions which have been referred to above. Unless these solutions can be regenerated, the cost of removal of $SO_2$ is substantial and in some cases may verge on the prohibitive.

It has been proposed to regenerate ammoniacal solutions which have become spent, i.e., have reacted with as much $SO_2$ as they can, by boiling out $SO_2$ or stripping the spent solutions. While this method is operative, it is fairly expensive in terms of energy and steam requirements, and some thiosulfate is always formed, which acts as a catalyst for oxidation of the sulfite. This results in accumulation of ammonium sulfates, with loss of $SO_2$ and additional cost for removal of the ammonium sulfate. It is with an improved treatment of spent solutions from the ammoniacal absorption of $SO_2$ that the present invention deals.

SUMMARY OF THE INVENTION

According to the present invention the spent ammoniacal solution, which is produced in general by the known methods of absorbing $SO_2$, is introduced under pressure into a stripping column against a rising stream sulfide or other sulfiding gases, which will be referred to generally under this designation. The column is operated at a temperature which is above the melting point of elemental sulfur but below the boiling point of sulfur, and the sulfiding gas or gases are introduced at a low point in the column, in any event below the point of introduction of the spent solution, for example just above a reboiler at the bottom of the stripping column or tower.

The composition of the spent absorbing solution depends on the flow rates of the gases containing $SO_2$ and the gas composition and temperature. With low concentrations of $SO_2$, for example about 0.3%, which is typical of stack gases and other gases from which dilute $SO_2$ is to be removed, ammonia should be in slight excess over the $SO_2$ in the spent solution; a molar concentration ratio $SO_2:NH_3$ of approximately 0.8 with a concentration of $NH_3$ equal to about 15 moles per 100 moles of $H_2O$ represents a suitable illustrative example. The exact ratio is not extremely critical but should not fall significantly below 0.8 as this would represent a failure to achieve the maximum absorption capacity of the $NH_3$. A significanty higher ratio results in larger equipment capacity, which is sometimes practically excessive, and also increases oxidation of the sulfite to thiosulfate and sulfate. In a more specific aspect of the present invention a molar concentration $SO_2:NH_3$ not differing significantly from 0.8 is included.

The essential features of the present invention are the reaction of the spent ammoniacal absorbing solution with sulfidizing gases in a column or a tower under pressure and temperature such that molten elemental sulfur is produced and can flow down. The source of the sulfidizing gas is not the critical distinction of the present invention from the prior art, and sulfidizing gas from any convenient source may be used, which lends considerable flexibility to the present process. One convenient source of sulfidizing gas is by the reaction of hydrogen or synthesis gas from the partial combustion of gaseous fuel with air or oxygen with some of the elemental sulfur produced in the process; preferably the reaction takes place in the presence of water vapor. A typical production of sulfidizing gases, which is illustrative only, is as follows: Natural gas is reformed in a mixture of 2.72 volumes of air per volume of gas. The gas leaves the reformer at 130 p.s.i.a. and 2200° F. containing—

|  | Percent |
|---|---|
| $CO_2$ | 1.0 |
| $CO$ | 19.0 |
| $H_2O$ | 1.0 |
| $H_2$ | 37.2 |
| $CH_4$ | 0.5 |
| $N_2$ | 41.3 |

To each 100 s.c.f. of this gas is added water, steam and elemental sulfur to provide 20 s.c.f. of additional water vapor and 4 lbs. of sulfur. The gaseous mixture is passed over a catalyst, for example bauxite, at a temperature of from 450° to 2000° F., but preferably from 800° to 1400° F. Under these conditions the carbon monoxide and water vapor react to form hydrogen and carbon dioxide which almost completely with sulfur to produce hydrogen sulfide and carbon dioxide. A small amount of carbonyl sulfide is produced and, with the very small excess of sulfur vapor the residual concentrations of carbon monoxide and hydrogen are extremely small.

When the sulfiding gases are introduced in the bottom of a column or tower under pressure and at temperatures above the melting point of elemental sulfur as described above but of course below the boiling point of elemental sulfur, the sulfur formed by reaction with the $SO_2$ in the of vapor and gas containing hydrogen sulfide, carbonyl ammonium sulfite or bisulfite flows down the column with the aqueous solution.

In order to simplify the discussion, the sulfiding gas will be considered as $H_2S$. Reactions of carbonyl sulfide produce the same results and form some carbon dioxide. It will be noted that some generalized equations are set forth below. These are overall reactions as a number of reactions take place in the column to produce sulfur. However, it is the overall result which counts, and the present invention is, therefore, not intended to be limited to any particular sequence of intermediate reactions. We know that they occur, but it is the final product that is of importance, and so while mention is made of stage or side reaction, this is merely for information and without intending to limit the invention to the particular reactions set forth. As a matter of fact, it is not known with exactitude just what these reactions are, and since they finally wind up with a final product which is the only matter of importance for the present invention, the latter is not concerned with exact intermediate reactions.

When the sulfiding gases are admitted to the bottom of the column or to the reboiler, which is a very convenient point, molten elemental sulfur is produced by reaction with the $SO_2$ content of the ammonium sulfites and bisulfites and flows down as a liquid through the column, as has been described. Vapor from each stage of the column is ammonia-rich and the ammonia is progressively more concentrated in the vapor, and in the liquid, from the bottom of the column to the feed point and above the feed point to the overhead vapor from the top of the column.

Conversely, the maximum concentration of sulfur dioxide is at or near the bottom of the column. The relationship between the concentrations of ammonia and sulfur dioxide is given by the following equations. The equations as physical chemical equations are not the new discovery of the present invention, but they are used with the hot, high pressure tower and the other features of the present invention to produce the improved results thereof. As a matter of fact, the equations are described by Johnstone (Industrial & Engineering Chem. 27, 587 (1935)).

$$P_{SO_2} = M \frac{(2S - C + 2A)^2}{C - S - 2A}$$

$$P_{NH_3} = N \frac{C(C - S - 2A)}{2S - C + 2A}$$

where C is the concentration of $NH_3$, S is the concentration of $SO_2$, A is the concentration of sulfate and other fixed anions, all in moles per 100 moles of $H_2O$.

The coefficients, M and N, are given by log M = 5.865 – 2369/T
log N = 13.680 – 4987/T The partial pressure of water is $$P_{H_2O} = P_W \left[ \frac{100}{100 + C + S} \right]$$

where $P_w$ is the vapor pressure of pure water at the temperature T in ° K. The pressures, $P_{SO_2}$, $P_{NH_3}$, $P_{H_2O}$ and $P_w$, are in mm. of mercury.

From these relationships and the heat and material balances at each stage it is possible, following the design procedures of distillation column calculations, to estimate the liquid and vapor compositions along the column assuming equilibrium at each stage, as in a perfect plate column. This, of course, depends on the reflux ratio at the top of the column, the reboil ratio in the reboiler, the temperature and composition of the feed solution and the pressure in the column. The equations are, of course, theoretical, that is to say, they are based on conditions of equilibrium in each stage. In a real column perfect equilibrium in each stage is not practical with a useful residence time in the column. However, the allowance for the inefficiency in each stage of a real column should be made. Since the efficiency varies from one column to another and with throughput rates and other factors, the ideal column equations are used, which is a procedure well known and used by column designers and operators. Since the present invention is not limited to any particular specific column with all its parameters, the ideal column equations are used and corrections for inefficiency in a real column are made in accordance with well known design calculations.

As has been described above, the reactions of the sulfiding gas introduced at the bottom of the column or at the reboiler are not intended to limit the invention. The reactions are extremely complex in their totality, but without limiting the invention to any theory it is believed and is quite probable that the primary reaction is between hydrogen sulfide and sulfur dioxide to produce thiosulfurous acid:

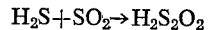
$$H_2S + SO_2 \rightarrow H_2S_2O_2$$

If the hydrogen sulfide is present in excess of the sulfur dioxide, the reaction proceeds to produce elemental sulfur,

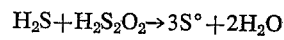
$$H_2S + H_2S_2O_2 \rightarrow 3S° + 2H_2O$$

If, on the other hand, the sulfur dioxide is in excess, the reactions proceed sequentially to produce thiosulfate and polythionic acids.

Hydrogen sulfide is in excess over the $SO_2$ where it enters the column, in the reboiler or in the lower sections. Here, under the pH conditions which prevail, it is but very slightly soluble as free $H_2S$ or bisulfide; it does dissolve in stoichiometric proportion to the free $SO_2$ content of the solution and thereby inhibits formation of thiosulfuric and polythionic acids. Much of the hydrogen sulfide is consumed in the lower section of the column or in the reboiler.

In accordance with this invention the flow of hydrogen sulfide (or sulfidizing gas) is controlled in relation to the sulfur dioxide content of the feed solution so that in the vicinity of the feed plate the sulphur dioxide is in excess in the liquid phase as well as in the gas phase. The small amount of hydrogen sulfide (or sulfidizing gas) which escapes from reaction rises and is condensed as ammonium bisulfide in the rectification section of the column. This refluxes down the column in the solution until it is reacted and converted ultimately to elemental sulfur.

In accordance with the invention and designating the sulfiding gas as hydrogen sulfide for simplicity, as has been stated above, sulfur dioxide, which enters with the feed solution, and hydrogen sulfide, which is admitted to the reboiler or to the lower part of the column below the feed point, are reacted, or refluxed and ultimately reacted to produce molten sulfur. Intermediate products of reaction are refluxed and converted ultimately to sulfur. Ammonium sulfate and other fixed ammonium salts are likewise refluxed, appearing in the reboiler and in the bottom product.

While the invention is not restricted to an exact ratio of sulfiding gas to $SO_2$ content in the absorber solution, it is desirable to maintain the introduction of the sulfiding gas, referring to it again typically as $H_2S$, in stoichiometric proportion to the sulfur dioxide content of the feed solution containing the sulfur dioxide as sulfites and bisulfites. When the introduction is approximately in stoichiometric proportion, the overhead vapor consists of ammonia and wateer vapor with substantially no $H_2S$ or $SO_2$. Similarly the bottom solution may contain ammonium sulfate and other fixed salts of ammonium, but it will contain substantially no $SO_2$. This makes possible a convenient method of monitoring or control. If the rate of admission of $H_2S$ is greater than that of $SO_2$ in the feed solution, $H_2S$ will appear in the overhead vapor. On the other hand, if the $SO_2$ rate is in excess of that of $H_2S$ the overhead vapor remains substantially free of $H_2S$ but $SO_2$ appears in the underflow. It is apparent that if the overhead vapor and bottoms are monitored for $SO_2$ and $H_2S$ content it is possible to determine the excess of one or the other and to adjust the flow rates to a stoichiometric balance or to any proportion which is desired.

Molten elemental sulfur is produced not only in the reboiler but also throughout the column. Accordingly, whereas numerous types of columns and reboilers are suitable for carrying out the invention, it is necessary to provide for the collection and runoff of the sulfur, and example by use of a packed tower or perforated plate column.

The overhead vapor, containing ammonia and water vapor, contains considerable free energy which may be utilized in an expander or in an evaporator. Condensate, which is obtained from an evaporator or from a condenser following expansion, consists of an ammonia solution which may be returned to be used for $SO_2$ absorption. Uncondensed vapor then consists of ammonia with some moisture. This may be utilized also in absorption of $SO_2$ by absorbing the gaseous ammonia in a solution containing ammonium bisulfite, forming a mixture of sulfites and bisulfites.

The bottoms of the column in which elemental sulfur is produced contain ammonium sulfate and, in the preferred embodiment of this invention, very little ammonium sulfite and bisulfite. This solution may be treated for ammonium sulfate recovery by evaporation and crystallization, or it may processed by any of the methods of the prior art, for example by boiling with lime to distill and recover the ammonia. The recovered ammonia may be used to form more $SO_2$ absorbent liquor or for any other purpose.

It will be noted that the present invention recovers ammonia economically and also produces elemental sulfur as a product. For the most part this elemental sulfur may be used to produce more sulfiding gas, as has been mentioned above. However, the sulfidizing gas as well as the ammonia are recycled and constitute a circulating load which requires only a small amount of makeup ammonia. As the $SO_2$ from the stack gases or other sources is introduced into the system as a raw material, a portion at least of the elemental sulfur constitutes a final product of the process. As sulfur can be shipped long distances, it represents an economically valuable final product. This is another factor contributing to the desirable economy of the process.

BRIEF DESCRIPTION OF THE DRAWINGS

The drawing illustrates in semi-diagrammatic form a reactor column.

DESCRIPTION OF THE PREFERRED EMBODIMENTS

In the drawing the reactor column 1 is illustrated diagrammatically as a packed column. A solution of ammonium sulfite and ammonium bisulfite from the absorption of the $SO_2$ from gases containing it is introduced into the column through conduit 2 and $H_2S$ in introduced at the bottom of the column just above the reboiler 4 through the conduit 3. The column 1 is heated and maintained at a temperature somewhat above the melting point of elemental sulfur. As the heating of the column is by conventional means no special heater is shown as it would only confuse the diagrammatic drawing.

The $H_2S$ rises in the packed column and reacts with the $SO_2$ content of the ammonium sulfite and bisulfite, producing elemental sulfur, which because of the temperature at which the column is maintained is in the molten state and flows down through the column. Ammonia and water, which may contain a very small amount of $SO_2$, rise in the form of vapor to the top of the column and flow through a conduit 7 into a water cooled condenser 8 of conventional design. The condensate flows back into the top of the column through the conduit 9 and ammonia leaves the condenser and is recovered. The ammonia can be transformed into ammonium sulfites by reaction with $SO_2$ in the gases from which the $SO_2$ is absorbed.

The molten sulfur flows down into the reboiler 4 and separates from a solution of ammonium sulfate in water leaving the reboiler through the conduit 5. The ammonium sulfate solution leaves through conduit 6 and constitutes a minor bleed stream. In the reboiler the sulfur and the ammonium sulfate solution are separated and ammonia vapors are boiled off, entering the column through the conduit 10 and rising with the $H_2S$, which reacts with them as well as with the $SO_2$ content of the solution introduced through conduit 2. The reboiler, which is of conventional design, is heated by steam as indicated diagrammatically.

The $H_2S$ coming in through the conduit 3 reacts with practically all of the $SO_2$ content of the solution of ammonium sulfite and bisulfite in the column; thus there is little or no $SO_2$ vented with the ammonia from the condenser 8. However, some $SO_2$ in the form of aqueous solution of sulfites of ammonia is condensed in the condenser 8 and returns to the reactor column through the conduit 9, where it is heated up as it passes down through the column and reacts with the $H_2S$, as has been described. It is desirable to introduce sufficient $H_2S$ so that very little, and in some cases no, $SO_2$ leaves the top of the column. The rate of flow of $H_2S$ should not be so great that $H_2S$ passes into the condenser 8, but the flow of $H_2S$ is not critical and this does not represent an operating problem.

We claim:

1. In a method of recovering ammonia and sulfur content of an aqueous solution of ammonium compounds with sulfurous acid, the improvement which comprises introducing said solution into a distillation column at a point intermdeiate the bottom and the top of the column, introducing a sulfidizing gas selected from the group consisting fo hydrogen sulfide and carbonyl sulfide substantially at the bottom of said column, and maintaining the temperature in the column above the melting point of sulfur but below the temperature at which elemental sulfur boils, and recovering ammonia rich vapor from the overhead of the column and water and molten sulfur from the bottom, whereby at the bottom of the column there is a large excess of sulfidizing gas over sulfur dioxide.

2. The method according to claim 1 in which the rate of solution flow and sulfidizing gas flow are controlled to minimize hydrogen sulfide in the overhead stream and sulfur dioxide in the liquid stream leaving the bottom of the column.

3. The method according to claim 2 in which the aqueous solution has an effective molar concentration ratio of $SO_2$ to $NH_3$ approximating 0.8.

4. The method according to claim 1 in which the recovered ammonia vapor is recycled as an aqueous solution for the absorption of sulfur dioxide.

References Cited

UNITED STATES PATENTS

| 3,561,925 | 2/1971 | Deschamps et al. | 423—356 |
| 3,182,005 | 5/1965 | Lupfer | 23—255 R |
| 2,863,725 | 12/1958 | Maude et al. | 423—565 X |
| 1,992,896 | 2/1935 | Bley | 423—565 X |

OSCAR R. VERTIZ, Primary Examiner

H. S. MILLER, Assistant Examiner

U.S. Cl. X.R.

203—50, 86; 423—547, 567